Patented Aug. 30, 1938

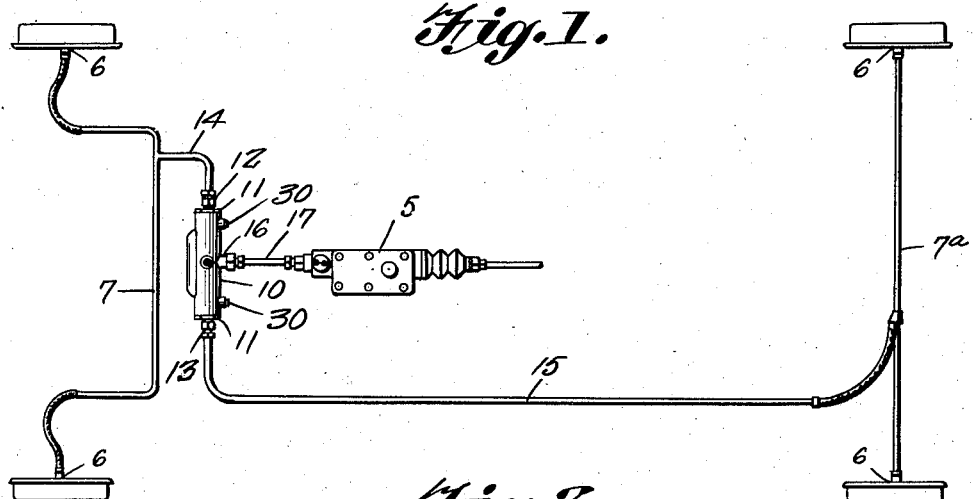

2,128,853

UNITED STATES PATENT OFFICE 2,128,853

SAFETY DEVICE FOR HYDRAULIC BRAKES

Raymond N. Roen, Duchess, Alberta, Canada

Application May 10, 1938, Serial No. 207,093

2 Claims. (Cl. 303—84)

My invention relates to improvements in hydralic braking devices and more particularly to the liquid control devices used in connection with four wheel hydraulic brakes of motor vehicles.

In the conventional type of hydraulic braking devices, such as used in connection with four wheel hydraulic brakes for motor vehicles, the liquid employed in such devices or systems is controlled from a single cylinder by a single plunger operated by the brake pedal of the motor vehicle and a single conduit leading from the cylinder to all of the wheel braking units. In a construction of this character should the conduit develop a leak or be ruptured, the entire braking system is rendered inoperative. Should this occur during the operation of the motor vehicle and whether the same be noted or not by the operator, it would preclude the operator from having a braking control over the motor vehicle and thus constitute a serious menace to the passengers of the vehicle as well as to the public.

Therefore, it is one of the principal objects of my invention to provide a device equipped with means operable upon leakage or line rupture to maintain a pair of the brake operating units in operating condition while the other pair of brake operating units are inoperative, thereby permitting the operator to exercise sufficient braking control over the motor vehicle until such time as the motor vehicle may be brought to a stand-still and the damage to the parts repaired.

Another object of my invention is to provide a device of the above described character which is simple in construction, durable in use, highly efficient in operation and economical in manufacture.

Another important object of my invention is to provide a device of the above described character which may be attached to motor vehicles already in use without any substantial modification of the parts thereof.

Other objects and advantages will be apparent from the following description, appended claims and annexed drawing.

Referring to the drawing wherein like reference characters designate like parts throughout the several views:

Figure 1 is a diagrammatic view showing my invention connected within the braking system of a motor vehicle equipped with four wheel type of brakes.

Figure 2 is a horizontal sectional view of my device.

Figure 3 is a central transverse sectional view of my invention.

Figure 4 is an enlarged detail sectional view illustrating the construction of one of the auxiliary ports.

In practicing my invention there is illustrated a master brake cylinder 5 of a motor vehicle of ordinary construction, the same being employed in connection with a brake pedal to effect actuation of brake units 6. The brake units 6 are connected together in pairs forming front and rear pairs on the front and rear wheels respectively by means of lines 7 and 7a. My device comprises a cylinder 10 having open ends closed by caps 11. Said caps have pipe connections 12 and 13 respectively. The pipe connection 12 is connected to the front line 7 by means of a pipe 14 while the pipe connection 13 is connected to the rear line 7a by means of a similar pipe 15.

Intermediate the ends thereof the cylinder is fashioned with a pipe connection 16 connected to the master cylinder 5 by means of a pipe 17. Slidable within the cylinder 10 is a pair of opposed cup shaped pistons 18 having seated therein the ends of coil springs 19, the opposite ends of said coil springs being seated within the caps 11 and said springs normally urge the pistons towards each other.

Journaled in a bearing formed on the inner wall of the cylinder 10 is a shaft 20 having fixed on the inner end thereof an elongated cam member 21 for engagement with the inner faces of the pistons whereby to maintain the same in spaced relation against the action of the springs 19.

Said shaft extends without the cylinder and is provided with adjusting nuts 22 whereby said cam may be readily adjustable to a desired position within said cylinder for a purpose hereinafter described. The outer wall of the cylinder is fashioned with a by-pass chamber 23 communicating with the interior of the cylinder and centrally thereof by means of a port 24 located diametrically opposite the bore of the pipe connection 16. Spaced on each side of the port 24 is a smaller port 25 effecting communication between the by-pass chamber and the interior of the cylinder. Said ports 25 are normally closed by the pistons 18 when the cam 21 is adjusted to maintain the pistons in their extreme spaced positions relative to each other as illustrated in Figure 2.

Adjacent the ports 25 the cylinder is fashioned with auxiliary ports 26 of a relatively small diameter whereby to maintain fluid in the lines 14 and 15 from the line 17 through the port 24 and chamber 23. The ports 26 are of a size while permitting fluid to pass therethrough for the purpose of contraction and expansion due to the temperature changes, do not permit a sufficient quantity to pass therethrough to operate the brake units 6.

Each of the pistons 18 adjacent the outer ends are fashioned with circumferentially extending grooves 27. Said grooves are adapted to receive therein spring pressed balls 28 mounted within a housing 29 formed on the cylinder.

Suitable screws 30 are employed to maintain said balls within said housing in operating condition. The inner faces of the caps 11 are provided with gaskets 31 serving as fluid seals for the outer faces of the pistons 18 when the same are actuated thereagainst.

In operation, fluid having been introduced into the cylinder, by-pass chamber and connected lines 7, 14 and 15, pressure is applied thereto within the master cylinder 5 thereby exerting pressure against the inner faces of the pistons 18 and causing the same to move towards the ends of the cylinder. This movement of the pistons serves to force the liquid in the pistons between the caps 11 and pistons 18 into the pipes 14 and 15 for actuating the brake units 6 in the usual manner.

Upon the rupture or leakage of one of the lines connected to the cylinder 10, for instance by way of example line 15, the fluid in said line 15 will be discharged therefrom permitting the respective pistons controlling the line to be moved into engagement with the gasket 31 of the cap 11 and effect seating of the ball 28 within the groove 27, thereby maintaining said piston in a locked position and preventing fluid from the cylinder from entering the line 15. When the piston is thus locked the opposite piston continues to function in the usual manner.

Obviously, a leak or breakage in the line on the opposite side of the cylinder 10 would cause a reverse operation of the parts heretofore described and maintain the other parts in operating condition.

In instances where it is necessary to effect a bleeding of the connected lines the shaft 20 is adjusted to position the cam to permit the pistons under the action of the springs 19 to move closer together and open the ports 25.

From the foregoing will be apparent that my invention provides a simple and reliable means whereby the front or rear braking units are maintained in operating condition upon a rupture or leak in the line connecting the other braking units to the master cylinder and thereby permits the operator of a motor vehicle to maintain a braking control thereover.

What I claim is:

1. A device of the character described, comprising, a cylinder adapted to be filled with a brake operating fluid, opposed pistons operable in said cylinder, springs within said cylinder for urging said pistons towards each other, said cylinder formed with a by-pass chamber, a port effecting communication with the interior of said cylinder and said chamber between said pistons, a pair of ports effecting communication between said chamber and said cylinder and normally closed by said pistons, auxiliary ports effecting communication between said chamber and said cylinder, a cam mounted in said cylinder between said pistons for maintaining said pistons in spaced relation to effect a closing of said pair of ports, and means carried by said cylinder for latching said pistons against movement.

2. A device of the character described, comprising, a cylinder adapted to be filled with a brake operating fluid, opposed pistons operable in said cylinder, springs within said cylinder for urging said pistons towards each other, said cylinder formed with a by-pass chamber, a port effecting communication with the interior of said cylinder and said chamber between said pistons, a pair of ports effecting communication between said chamber and said cylinder and normally closed by said pistons, auxiliary ports effecting communication between said chamber and said cylinder, and a cam mounted in said cylinder between said pistons for maintaining said pistons in spaced relation to effect a closing of said pair of ports.

RAYMOND N. ROEN.